US010318110B2

(12) United States Patent
Naaman et al.

(10) Patent No.: US 10,318,110 B2
(45) Date of Patent: Jun. 11, 2019

(54) LOCATION-BASED VISUALIZATION OF GEO-REFERENCED CONTEXT

(75) Inventors: Mor Naaman, San Francisco, CA (US);
Shane Ahern, Foster City, CA (US);
Simon P. King, Berkeley, CA (US);
Rahul Nair, Oakland, CA (US)

(73) Assignee: OATH INC., New York, NY (US)

( * ) Notice: Subject to any disclaimer, the term of this patent is extended or adjusted under 35 U.S.C. 154(b) by 2033 days.

(21) Appl. No.: 11/893,016

(22) Filed: Aug. 13, 2007

(65) Prior Publication Data
US 2009/0049408 A1 Feb. 19, 2009

(51) Int. Cl.
| G06F 3/0482 | (2013.01) |
| G06F 3/0481 | (2013.01) |
| G06F 3/0484 | (2013.01) |
| G06Q 30/02 | (2012.01) |
| G06F 16/58 | (2019.01) |

(52) U.S. Cl.
CPC .......... *G06F 3/0482* (2013.01); *G06F 3/0481* (2013.01); *G06F 3/0484* (2013.01); *G06F 16/58* (2019.01); *G06Q 30/02* (2013.01); *G06F 2203/04806* (2013.01)

(58) Field of Classification Search
CPC .... G06F 3/0481; G06F 3/0482; G06F 3/0484; G06F 9/4443; G06F 16/58; G06F 2203/04806; G06Q 30/02
USPC .................................................. 715/809, 855
See application file for complete search history.

(56) References Cited

U.S. PATENT DOCUMENTS

| 6,714,215 | B1 * | 3/2004 | Flora et al. ................... 715/716 |
| 6,879,702 | B1 * | 4/2005 | Fisher et al. ................. 382/100 |
| 7,269,796 | B1 * | 9/2007 | Bayes ............... G06F 17/30554 |
| | | | 707/E17.032 |
| 7,379,811 | B2 * | 5/2008 | Rasmussen et al. .......... 701/208 |
| 2002/0067379 | A1 * | 6/2002 | Kenyon et al. ............... 345/838 |
| 2003/0033296 | A1 * | 2/2003 | Rothmuller ....... G06F 17/30017 |
| 2004/0217884 | A1 * | 11/2004 | Samadani et al. ....... 340/995.14 |
| 2005/0050043 | A1 * | 3/2005 | Pyhalammi et al. ............. 707/6 |

(Continued)

OTHER PUBLICATIONS

Arampatzis, A. et al. (Jul. 2006). "Web-Based Delineation of Imprecise Regions," *Computers, Environment and Urban Systems* 30(4):436-459.

(Continued)

*Primary Examiner* — Tuyetlien T Tran
(74) *Attorney, Agent, or Firm* — James J. DeCarlo; Greenberg Traurig, LLP

(57) ABSTRACT

Apparatuses and methods for location-based visualization of geo-reference content are provided. Apparatus may include logic for causing a display of a map having at least one tag displayed therewith, and logic for causing the display of a set of content objects in response to selection of the tag, the set of content objects associated with the tag and the geographical location of the map. The content objects may be displayed in a viewing window adjacent the map and selectable by a user. The content objects may be filtered by a user, e.g., indicating that a content object is incorrectly tagged or geo-referenced. The apparatus may dynamically update the content based on user interaction. The set of tags and content objects displayed may vary based on a particular zoom level and associated tags may be displayed in response to selection of a tag and/or a content object.

14 Claims, 8 Drawing Sheets

(56) References Cited

U.S. PATENT DOCUMENTS

| | | | |
|---|---|---|---|
| 2005/0251331 A1* | 11/2005 | Kreft | 701/207 |
| 2006/0026170 A1* | 2/2006 | Kreitler et al. | 707/10 |
| 2006/0037990 A1* | 2/2006 | Geise | 228/101 |
| 2006/0200308 A1* | 9/2006 | Arutunian | 701/208 |
| 2006/0242178 A1 | 10/2006 | Butterfield et al. | |
| 2006/0253246 A1* | 11/2006 | Cera et al. | 701/117 |
| 2006/0271277 A1* | 11/2006 | Hu et al. | 701/202 |
| 2006/0271287 A1* | 11/2006 | Gold et al. | 701/211 |
| 2007/0011150 A1* | 1/2007 | Frank | 707/4 |
| 2007/0083329 A1* | 4/2007 | Im | 702/5 |
| 2007/0115373 A1* | 5/2007 | Gallagher et al. | 348/231.3 |
| 2007/0143345 A1* | 6/2007 | Jones et al. | 707/104.1 |
| 2007/0258642 A1* | 11/2007 | Thota | G06F 17/30241 382/173 |
| 2007/0268313 A1* | 11/2007 | Dolph et al. | 345/635 |
| 2007/0271297 A1* | 11/2007 | Jaffe et al. | 707/104.1 |
| 2007/0282941 A1* | 12/2007 | Takakura | G06F 17/30274 709/202 |
| 2008/0033652 A1* | 2/2008 | Hensley et al. | 702/5 |
| 2008/0040678 A1* | 2/2008 | Crump | 715/763 |
| 2008/0065321 A1* | 3/2008 | Dacosta | 701/208 |
| 2008/0086368 A1* | 4/2008 | Bauman et al. | 705/14 |
| 2008/0148175 A1* | 6/2008 | Naaman et al. | 715/781 |
| 2008/0172288 A1* | 7/2008 | Pilskalns et al. | 705/10 |
| 2008/0177793 A1* | 7/2008 | Epstein et al. | 707/104.1 |
| 2008/0195308 A1* | 8/2008 | Sloo | 701/208 |
| 2008/0285886 A1* | 11/2008 | Allen | 382/284 |

OTHER PUBLICATIONS

Jaffe, A. et al. (2006). "Generating Summaries and Visualization for Large Collections of Geo-Referenced Photographs," *Proceedings of the 8$^{th}$ ACM International Workshop on Multimedia Information Retrieval*, New York, NY, 2006, pp. 89-98.

Larson, R.R. (1996). "Geographic Information Retrieval and Spatial Browsing," in *Geographic Information Systems and Libraries: Patrons, Maps, and Spatial Information*, Smith, L.C. ed. et al., Graduate School of Library Information Science University of Illinois at Urbana-Champaign: Urbana-Champaign, IL, pp. 81-124.

Purves, R. et al. (2005). "Identifying Imprecise Regions for Geographic Information Retrieval Using the Web," *Proceedings of GIS Research UK 13th Annual Conference*, 2005, Glasgow, UK, pp. 313-318.

Slawski, B. (2005-2007). "SEO by the SEA: Internet Marketing and Search Engine Optimization (SEO) Research, Consulting, and Services," located at <http://www.seobythesea.com/?p=708>, last visited on Jul. 11, 2007, six pages.

U.S. Appl. No. 11/593,869, filed Nov. 6, 2006, by Naaman et al.

U.S. Appl. No. 11/639,563, filed Dec. 15, 2006, by Naaman et al.

* cited by examiner

LOCATION-BASED VISUALIZATION OF GEO-REFERENCED CONTEXT

BACKGROUND

Field

The present invention relates generally to systems and methods for the display of content, and in one example, to the display of a collection of geographically-referenced (or "geo-referenced") content objects such as text, still or moving images, audio files, and the like.

Related Art

An increasing number of resources on the Web are associated with location information such as GPS coordinates or other location identifiers. Such geo-referenced resources can be categorized geographically or displayed on a map, providing a rich spatial context in which to view a collection of resources.

As these collections grow, however, such systems are typically limited by the computing problem of being able to filter, sort, and summarize the collection in any useful manner. For example, displaying data items on a digital map inevitably leads to the viewable space becoming cluttered as the number of items increases, leading to overlapping items and making viewing and finding specific items ever more difficult as the collection grows.

BRIEF SUMMARY

According to one aspect of the present invention systems and methods for visualizing geo-referenced content are provided. In one example, apparatus is provided for causing the display of geographically referenced content objects, the apparatus including logic for causing a display of a map having at least one tag displayed therewith, and logic for causing the display of a set (one or more) of content objects in response to a selection of the tag, the set of content objects associated with the tag and the geographical location of the map.

The content objects may be displayed in a viewing window adjacent the map, where each content object is selectable by a user to access a higher resolution version or additional associated information. The content objects may be filtered by a user, e.g., indicating that a content object is incorrectly tagged or geo-referenced. The apparatus may dynamically update the visual content based at least in part on the user interaction. In some examples, the apparatus may further include logic for displaying a set of tags based on a particular zoom level and logic for causing the display of associated tags in response to a selection of a tag. Additionally, the apparatus may further include logic for causing the display of an advertisement based on a variety of factors such as user requests, selected tags or content objects, and so on.

According to another aspect of the invention, an interface for visualizing geo-referenced content objects is provided. In one example, the interface includes a map display for displaying a tag map having at least one selectable tag and a content object window for displaying content objects associated with the selected tags. The displayed content objects may be selected to access higher resolution versions or additional associated information. Additionally, the interface may display additional tags in response to a selection of a displayed tag.

According to another aspect of the invention, a method for visualizing geo-referenced content objects is provided. In one example, a method includes causing the display of a map and at least one tag displayed therewith, and causing the display of a viewing window for displaying a set of content objects in response to a selection of the tag, the set of content objects associated with the tag and the geographical location of the map.

The method may include displaying the content objects in a viewing window adjacent the map, wherein each content object is selectable by a user to access additional information. The content objects may be filtered by a user, e.g., indicating that a content object is incorrectly tagged or geo-referenced. The method may include dynamically updating the visual content based at least in part on the user interaction. In some examples, the method may include displaying a set of tags based on a particular zoom level and causing the display of associated tags in response to a selection of a tag. Additionally, the method may further include causing the display of an advertisement based on a variety of factors such as user requests, selected tags or content objects, and so on.

According to another aspect of the invention, computer program product comprising computer executable program code for visualizing geo-referenced content objects is provided. In one example, a computer program product comprising computer executable program code includes logic for causing the display of a map having at least one tag displayed therewith, and the display of a viewing window for displaying a set of content objects in response to a selection of the tag, the set of content objects associated with the tag and the geographical location of the map.

The various aspects and examples of the present inventions are better understood upon consideration of the detailed description below in conjunction with the accompanying drawings and claims.

DETAILED DESCRIPTION

The following description is presented to enable a person of ordinary skill in the art to make and use the inventions. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the inventions. Thus, the present inventions are not intended to be limited to the examples described herein and shown, but are to be accorded the scope consistent with the claims.

For the sake of convenience, at times, digital photographs or still images are used and described as examples of content objects manipulated by the exemplary system, but those skilled in the art will recognize that the various examples apply similarly or equally to other content objects, subject to appropriate modifications and use of other functions where appropriate. For example, a content object may include text, still or moving images, audio files, transcribed audio files, web log entries, web pages, articles, user comments, combinations of one or more content types, and so on.

In one example described herein, a geographically referenced content object visualization interface provides a versatile and intuitive way to view content objects in relation to their geographic location. In one example, the interface includes a map overlaid with various metadata tags (or "tags") that are associated with visual content of the map region (sometimes referred to herein as a "tag map"). For example, a collection of content objects such as digital photographs or web log entries may be grouped together using the content object's metadata, and made accessible through a selection of one of the displayed tags. When a user selects a particular tag, the content objects associated with the selected tag are displayed, e.g., in a viewing window. The tags may be displayed at their corresponding location on the displayed map, thus allowing a user to view a map and select the tag to display content objects associated with points of interest located on the map. The content objects displayed may be further selected to view metadata associated with the object as well as view the content object from its source (e.g., from a content object storage service provider such as Flickr™ or the like). In one example, the interface may display objects located in a collective database in which many users store their content objects; accordingly, the visualization system may allow users to view their content objects as well as those stored by other users.

Figure 1:
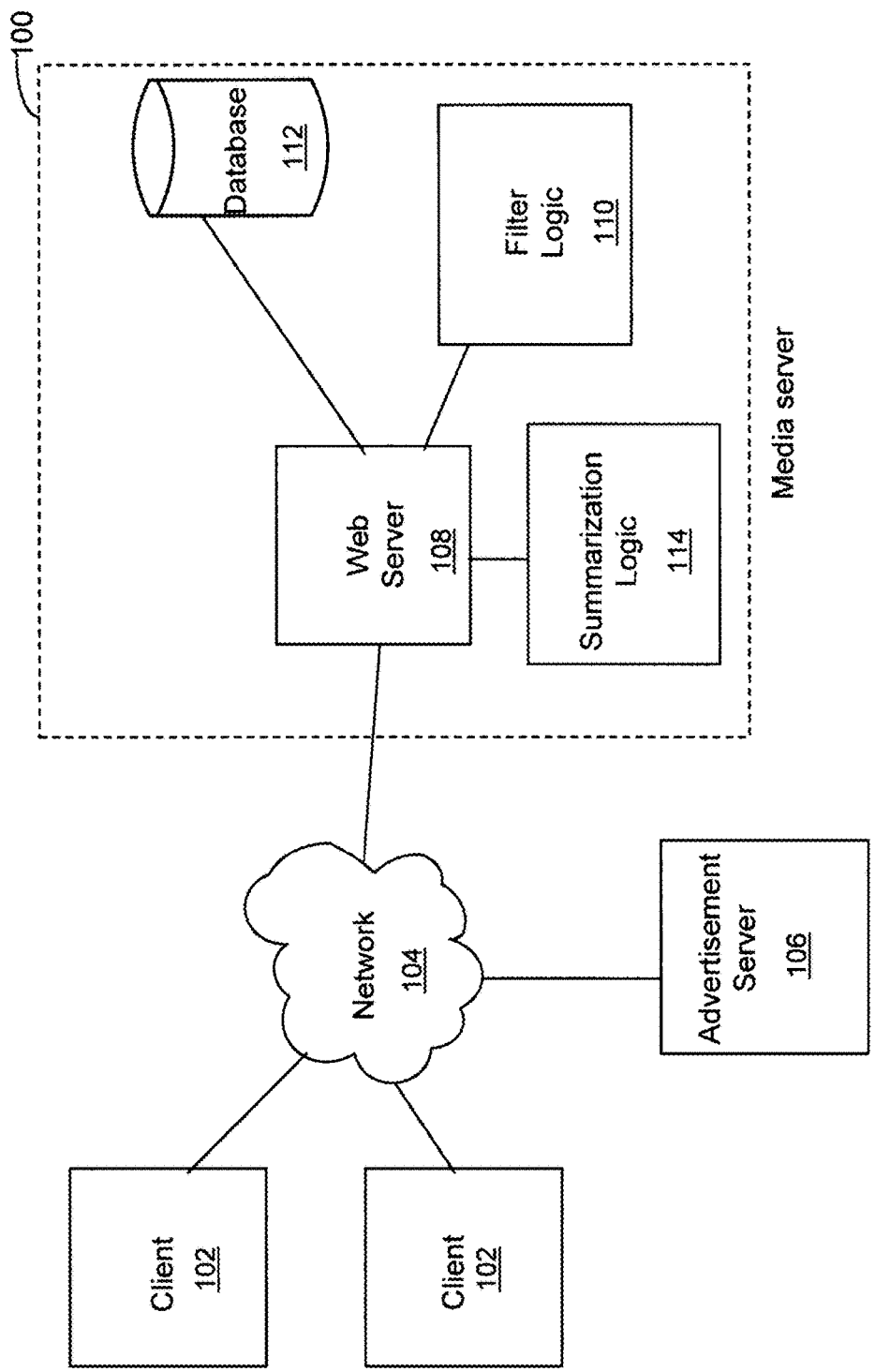
FIG. 1 illustrates an exemplary server diagram and environment in which some aspects and examples described herein may by used.

FIG. 1 illustrates an exemplary environment in which some examples of displaying a tag map and collection of content objects as described may be used. In particular, FIG. 1 illustrates a client-server system in which one or more clients 102 may communicate with a media server 100 via a network 104. Clients 102 and media server 100 may communicate, e.g., via suitable communication interfaces via a network 104, such as the Internet. Clients 102 and media server 100 may communicate, in part or in whole, via wireless or hardwired communications, such as Ethernet, IEEE 802.11b wireless, or the like. Additionally, communication between clients 102 and media server 100 may include various servers such as a photograph/image server, map server, mail server, mobile server, and the like.

FIG. 1 further illustrates an exemplary server diagram displaying media server 100, which may include a web server 108 interfacing with network 104 and including http web server logic, for example. Further, media server 100 includes a database 112 for storing content objects such as media objects, filter logic 110 for filtering the content or media objects based on user feedback (e.g., by removing irrelevant or inaccurately tagged content objects), and summarization logic 114 for processing one or more collections of content objects stored in database 112 (or otherwise associated with media server 100). It should be understood that filter logic 110 and summarization logic 114 may be located remotely from the media server or that their functions may be performed by a remote device or service provider. Further, it should be understood that database 112 may be any source of information such as a hosting service or remote database, and media server 100 can either be connected directly thereto or through network 104. For example, database 112 may be associated with a content object storage server such as Flickr™. Exemplary media object storage servers are described in U.S. patent application Ser. No. 11/350,635, entitled "MEDIA OBJECT METADATA ASSOCIATION AND RANKING," filed Feb. 8, 2006, which is incorporated by reference herein in its entirety.

Summarization logic 114 may include logic for organizing and/or summarizing a collection of content objects based on associated geographical references and generating tag maps. In one example, summarization logic 114 includes metadata-based heuristics associated with patterns in the photographs and users' photographic behavior. An exemplary heuristic includes the premise that photographs taken at a particular geographical location typically imply the presence of something interesting at the particular geographical location; for example, the attention paid to an object is generally an indicator of its importance. Thus, in one example, the summarization logic includes an algorithm operable to input one or more of a multitude of spatial, social, and temporal metadata, such as where the photograph was taken, by whom, at what time, etc., as well as textual-topical patterns in the data, such as textual tags associated with the photograph (e.g., user inputted tags). Furthermore, the algorithm may be adjusted to bias the set of results using various factors such as the social network distance of the photographers to the user making the query. Exemplary systems and methods for summarizing and diplaying content objects are described in U.S. patent application Ser. No. 11/437,344, entitled "SUMMARIZATION OF MEDIA OBJECT COLLECTIONS," and filed May 19, 2006, and Ser. No. 11/639,563, entitled "VISUALIZING LOCATION-BASED DATASETS USING 'TAG MAPS'", and filed on Dec. 15, 2006, both of which are hereby incorporated by reference in their entirety as if fully set forth herein.

It is noted that the specific example and algorithms described are illustrative of a specific implementation of selecting a summary of content objects from a collection of content objects and generating tag maps. Those of ordinary skill in the art will recognize that other systems and methods, utilizing various algorithms and inputs related to the content objects or the user, may be used to select summaries based on patterns within the collection of content objects. Accordingly, the described examples are not intended to be limiting.

In other examples, media server 100 may receive content objects for display to users from a remote source of information such as a remote database or hosting service. For example, media server 100 may send a request to the remote source of information and receive relevant content objects based on selected tags. The content objects may be categorized based on the summarization logic (associated with media server 100 or the remote source) or other scoring mechanism. For example, media server 100 may cause the display of the highest ranking content objects in response to the selection of a tag. It should be understood that other criteria such as visual features, social networking information, time of day, and the like, may be used to prioritize the content objects for display to a user. When an object receives negative feedback from a user, e.g., marked as irrelevant, media server 100 may remove the content object from the set of content objects associated with a particular tag for display and communicate to the remote source of information that the content object has received negative feedback. Media server 100 or the scoring system of the source of information may then use that information in calculating the content object's score and ranking in subsequent queries.

In one example, media server 100 further includes various components known in the art, e.g., a scripting engine (such as a PHP scripting engine), an aggregation engine, and the like. A scripting engine may include authentication logic, upload logic, metadata processing logic, and permissions handling logic. The authentication logic authenticates a user signing on to the media server web site. The upload logic may be used to upload from the client to the server data conforming to any media format, e.g., still image (e.g., JPEG, TIFF), video (e.g., MPEG, AVI), or audio (e.g., MP3, OGG). The aggregation engine may include a statistics engine and a search engine. A client for use with the exemplary media server 100 may include a typical web browser application.

Metadata processing logic permits a user to enter metadata to describe each image (as used herein, "metadata" may refer to one metadatum or plural metadata). Metadata may take the form of one or more tags for a content object. Other types of metadata include, e.g., a title, a description of the image, annotations, creator, and comments. Additionally, metadata associated with a device (e.g., device-supplied metadata) such as metadata from a digital camera that took the picture, including metadata regarding time of capture, aperture, shutter speed, and other settings. Such metadata may be extracted, for example, from the EXIF (Exchangeable Image File) header stored inside the uploaded file by many digital cameras, or the IPTC (International Press Telecommunications Council) header stored inside the uploaded file by many photograph management and organization software packages.

Additionally, metadata may include geographical reference data associated with the content object. For example, a device may generate a geographical location (e.g., from a GPS location device, cell identification, or other location technologies). Additionally or alternatively, a user may enter or edit the geographical location associated with a particular content object (either at the time of capture or later).

In one example, one or more clients 102 may transfer content objects and/or related metadata to media server 100 for inclusion within database 112 (or to a remote server associated with database 112). Further, one or more clients 102 may request summaries of a portion or all of the collection of content objects and/or related metadata included with database 112 or otherwise accessible via media server 100. For example, filter logic 110 and summarization logic 114 may process a collection of content objects stored locally, remotely, or combinations thereof.

The tag maps may be processed using the underlying geographically referenced content objects at varying time intervals. Generating the tags for display with the map infrequently generally allows for a quick response to a user query, e.g., whereby the user does not have to wait for the system to process the content objects and generate the corresponding tags for display. It should be understood, however, that such processing may be done dynamically in response to user requests.

Media server 100 further includes logic or is programmed to process content objects and format data, accessed from local or remote databases or other sources of data, for presentation to users of clients 102, preferably in the format discussed in the examples herein. To that end, media server 100 may utilize various Web data interface techniques such as Common Gateway Interface (CGI) protocol and associated applications (or "scripts"), Java® "servlets", i.e., Java® applications running on the Web server, or the like to present information and receive input from clients 102. Media server 100, although described herein in the singular, may actually comprise plural computers, devices, backends, and the like, communicating (wired and/or wireless) and cooperating to perform some or all of the functions described herein. Of course, media server 100 may be implemented in various fashions and include various hardware, software, or firmware to carry out the examples described herein.

FIG. 1 further illustrates an advertisement server 106, which may communicate through network 104 with one or more clients 102 and/or to server 100. Advertisement server 106 may operate to associate advertisements with user-generated search requests and/or responses for transmission to a client 102. For example, an advertisement may be associated with a response to client 102 based on the query and/or the particular response to the query. For example, an advertisement may be based on a map request, displayed or selected tags, displayed or selected content objects, user profile information, or combinations thereof. In one example, advertisement server 106 communicates with server 100 and transmits advertisement data thereto, for example, in response to a user-generated request received from client 102. Server 100 may transmit the advertisement data with a response to client 102. In other examples, the advertisement server may send the advertisement data directly to client 102 based on information from server 100 and client 102.

Figure 2A:
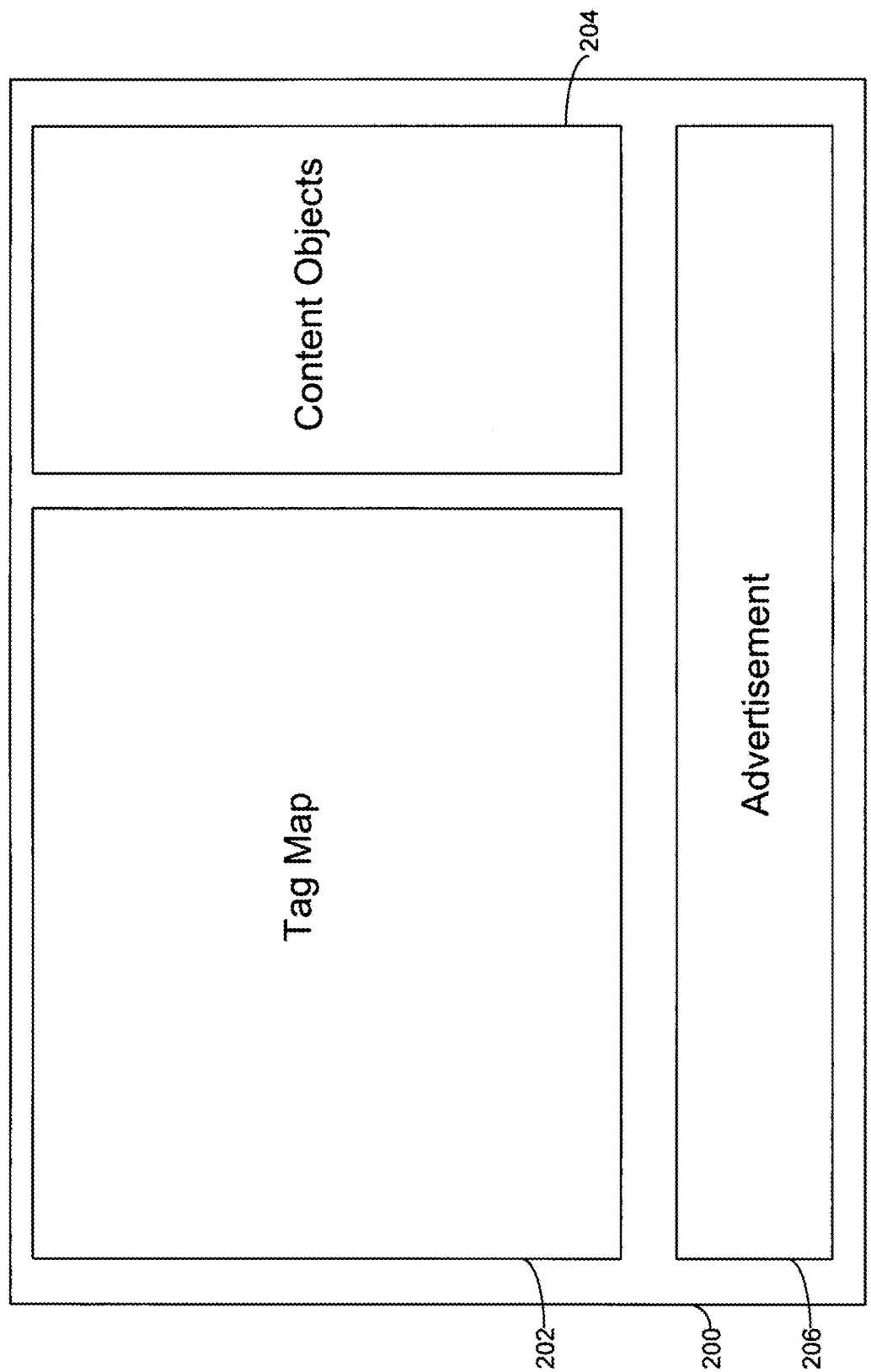
FIG. 2A illustrates an exemplary visualization system interface.

FIG. 2A illustrates an exemplary interface 200 of a content object visualization system. In this example, interface 200 contains a tag map window 202 for displaying a map and one or more selectable tags associated with content objects. Additionally, a content object window 204 is provided for displaying geographically referenced content objects associated with selected tags. In particular, when a user selects a tag displayed with the displayed map in tag map window 202, one or more content objects associated with the tag are displayed in content object window 204, thereby giving the user visual information for each area based on the selected tag. From content object window 204, a user may select a content object to view a higher resolution version of the object, a link to the content object, and/or metadata associated with the content object. A user may also provide feedback regarding certain content objects; in one example, marking content objects as irrelevant. In this example, an advertisement portion 206 is also displayed along with the tag map window 202 and the content object window 204 for displaying advertisements.

Figure 2B:
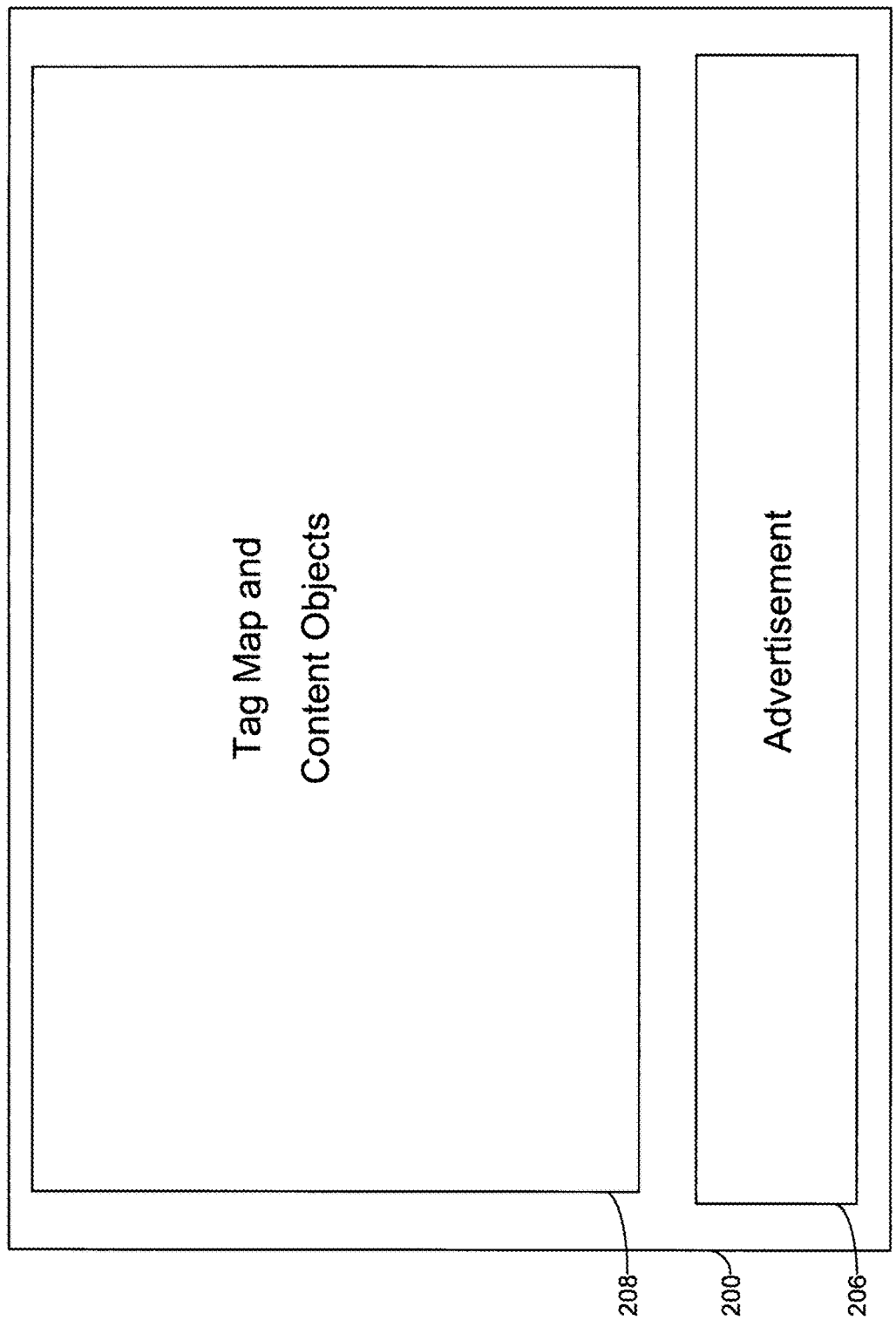
FIG. 2B illustrates another exemplary visualization system interface.

FIG. 2B illustrates another exemplary interface 201 of a visualization system. Interface 201 is similar to that of interface 200 described previously; however, in this example, the tag map and content objects are displayed together in a tag map and content object window 208. In response to a selection of a tag displayed with a map, at least one content object is displayed within the tag map and content object window 208, e.g., completely or partially overlaying a portion of the displayed tag map. For example, content objects may be displayed at or around the selected tag, around the border of the tag map, and so on.

Figure 3A:
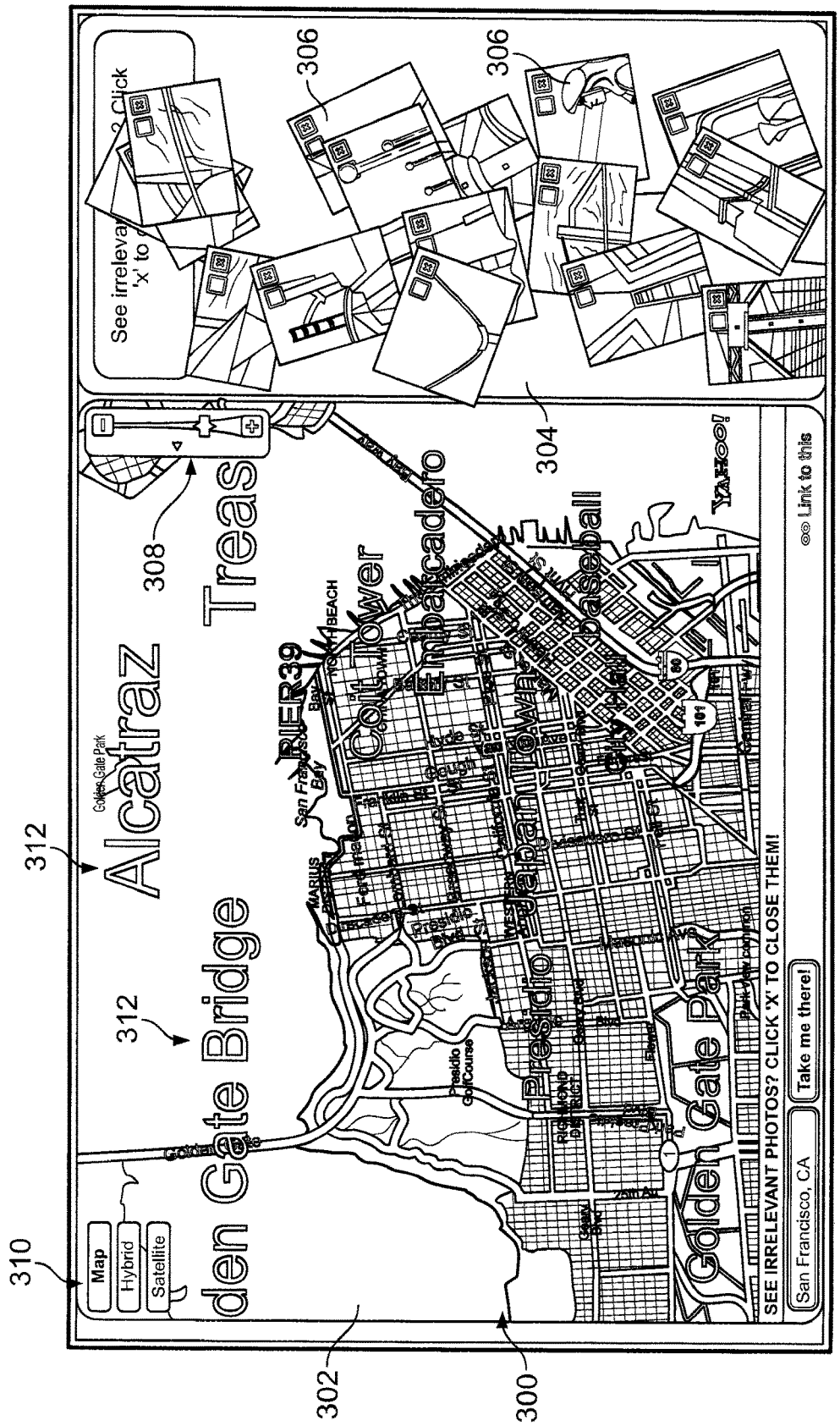
FIG. 3A illustrates an exemplary view of the visualization system interface with a tag selected.

FIG. 3A illustrates an exemplary interface 300 of the content object visualization system. Displayed in tag map window 302 is a map of San Francisco and several tags 312 including "Alcatraz", "Japan Town", and "Golden Gate Park", among others. In this example, the Golden Gate Bridge tag has been selected, and as a result, content objects 306 associated with the Golden Gate Bridge tag are displayed in the content viewing window 304. In this example, most of the content objects 306 displayed include photographs taken by users standing on the bridge itself (i.e., where the tag is displayed on the map); however, in instances where the same tag is displayed in a different location on the map (e.g., away from the bridge itself) images of the bridge from different vantages points would be displayed.

In one example, a user selection is made in response to a user "clicking" on a tag; however, in other examples, a user selection may be made in response to a user "hovering" over a tag (e.g., where a cursor is moved over a tag). Additionally, hovering over a tag may display information, e.g., related tags or other information, and clicking on a tag may cause the display of associated content objects. Other methods and techniques for selecting a tag and causing the display of associated content objects, metadata, and other information are possible and contemplated.

The initial map may be displayed in response to a user query (e.g., by inputting geographical location, zip code, address, or selecting regions on a map). Additionally, a default zoom level may be used depending on the initial query, with interface 300 allowing a user to change the zoom level and pan to different areas in any suitable manner. In one example, the user will be able to choose how much detail is to be displayed on the map by selecting a particular zoom level. This may be done using a zoom slidebar 308, for example. In one example, as the map display zooms in and out, the visualization system will determine which tags to display at that particular zoom level based upon the determined importance of the tag at that location and zoom level. Accordingly, as a user zooms out, e.g., by sliding the bar towards the "−" sign, the tag map window 302 will display a larger geographic region, but will show less detail (e.g., the map may display fewer geographical details such as street names etc.) and the displayed tags will be regenerated for the larger geographical region. As a user zooms in, e.g., by sliding the bar towards the "+" sign, the tag map window 302 will display a smaller geographical region, more detail (e.g., the map may display more geographical details), and display a modified set of tags.

In one example, and as shown in FIG. 3A, tags 312 may be displayed in varying sizes according to a scoring mechanism. For example, the displayed size of each tag represents the tag's "importance" relative to the location and zoom level. The larger the tag, the more important the tag is to the location based on the particular mechanism used. In determining the importance of each tag, various factors such as bias (or relevance), tag-distinguishability, photographer-distinguishability, density, recency, frequency, and the sum of image (and/or audio) qualities of the associated content object collection may be taken into consideration, where a weighted average is calculated to create a score for each tag. Exemplary scoring mechanisms are described in the aforementioned U.S. patent application Ser. No. 11/437,344, entitled "SUMMARIZATION OF MEDIA OBJECT COLLECTIONS," and filed May 19, 2006, which is incorporated herein by reference. It should be understood that any other various scoring mechanisms looking at any number of various factors may be used to display tags of varying sizes as described.

Figure 3B:
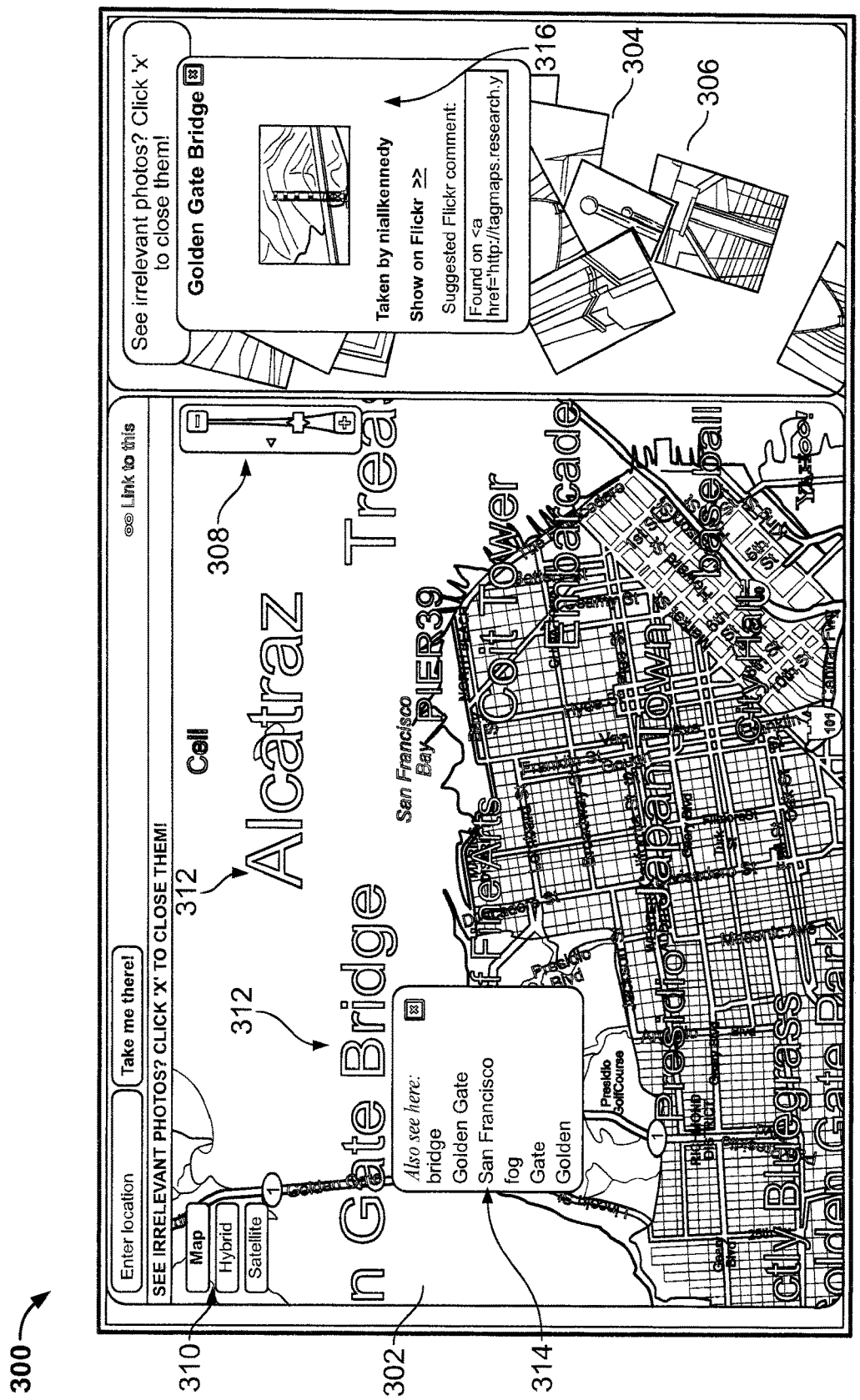
FIG. 3B illustrates an exemplary view of the visualization system interface with one of the content objects selected.

FIG. 3B illustrates exemplary interface 300 of the visualization system with one of the content objects selected. In this example, each content object includes a "+" sign, that when selected brings up an option box 316 to allow a user to view or download a larger image (e.g., the initially displayed objects may include thumbnails or low-resolution images and when selected allow access to a full or higher-resolution image), metadata associated with the content object, and/or a link to view the content object at its source. Also included is a "−" sign located on each content object which allows the user to mark the content object as irrelevant, thereby removing it from the content object window 306.

In another example, a list of associated tags 314 may be displayed in response to the selection of a tag 312 (e.g., in response to a hover operation or clicking on a tag). Interface 300 may display a list of surrounding tags in the vicinity of the selected tag as determined, e.g., by an algorithm, which takes into consideration the tag selected and tags in the vicinity. This allows the user to view other tags which might be of interest around a particular point on the map. It should be understood that other factors such as browsing history, social networks, and so on may be included as factors in determining associated tags.

In one example, the map described herein may have various display modes, which may be selected via map mode selections 310. One such mode includes a "map" mode, wherein the map comprises a drawn image with certain features (roads, highways) highlighted. Another such mode includes a "satellite" mode, wherein a satellite or aerial image is displayed. Another mode includes a "hybrid" mode, in which the satellite images used in the "satellite" mode have the major highways highlighted and labeled as is done in the "map" mode. Other modes suitable for illustrating geographical locations are possible and contemplated.

In one example, the displayed tag map and content objects may be displayed in various fashions and may have various content modes. For example, the content objects may be capable of various categorizations or filtering for display based on metadata or source information. For instance, content objects may be categorized based on their source (e.g., a social networking source, news source, travel source, and so on), as well as other metadata (e.g., user, time of day, time of year, and so on). A first content mode may include a basic or general view mode, which displays all categories and/or types of user content objects associated with a selected tag. Another content mode may include a night mode in which tags and/or content objects displayed will be those associated with night. For example, content objects containing metadata indicating that the content object was created or captured at night will be displayed. In other examples, a content mode may be based on other time parameters, e.g., time of year, season, day of the week, particular year, and so on. Further, the displayed tags within the map may be associated with the content mode selected; for example, instead of displaying the most popular tags based on all content available, the displayed tags are associated with the content mode (e.g., the displayed tags for the geographical region of San Francisco, Calif. may vary for day time and night time content modes, winter and summer content modes, and so on).

Additionally, a content mode may be based on the source of the content objects. An exemplary content mode includes a travel or trip mode, which is based on content objects from a travel service such as Yahoo! Travel users' public Trip Plans. Further, in one example (which may be used with other content modes), instead of displaying the highest rated tags based on the scoring mechanism, which may be found easily in any travel book or travel site, the content server logic searches each geographical location for a middle range of tags based on popularity. The resultant Tag Map may display various locations that may not be normally discovered from reading about the hot spots for a given location.

In another example, interface 300 may operate to automatically zoom in to view details of a particular location in response to a selection of a corresponding tag. For example, in response to a tag selection, interface 300 may zoom in around the selected tag to display tags and geographical detail around the point of interest. In doing so, the tags displayed on the map will be updated to show those in the immediate area within the viewing area of the zoomed in map.

Further, in one example, one or more advertisements may be displayed within or associated with interface 300 in response to the selection of a tag and/or content object. The advertisement content may be associated with a tag and/or content object, and displayed on the map, separate from the map, in the content viewing area, or with an associated window or interface.

Figure 4:
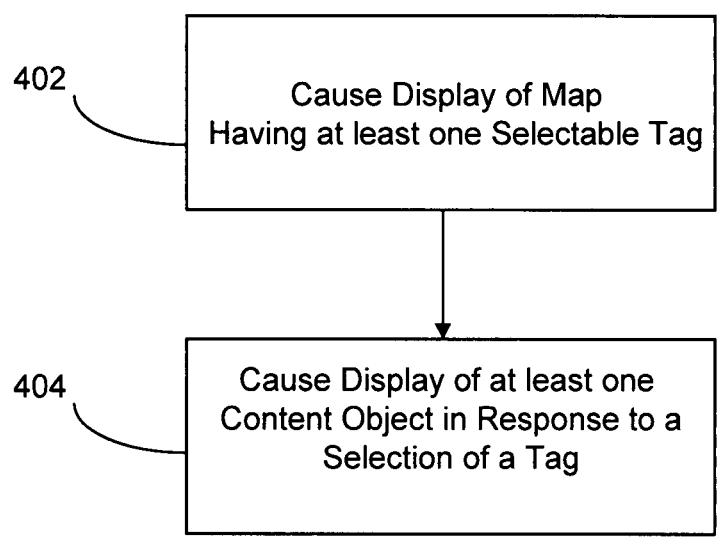
FIG. 4 illustrates a flow chart for causing the display of a map and associated tags.

FIG. 4 illustrates an exemplary method for causing the display of a map having associated tags and displaying a set of content objects in response to a selection of a tag. The method includes causing the display of a map having at least one selectable tag at block 402. The map may be displayed in response to a user query for a particular geographical location and the tags may be based on the content of a search (if a particular content type is selectable or selected) such as time of day or a travel/sightseeing map. The map may be retrieved from a map server (disposed locally or remotely to a media server). Further, as described herein, the tags may be generated and retrieved from a local or remote source associated with a collection of the geo-referenced content objects.

Upon selection of a tag, the method further includes causing the display of at least one content object associated with the selected tag at block 404. As described, the content object may be displayed overlaying or adjacent the display of a map, e.g., in a content viewing window. The content object may be displayed as a preview, thumbnail, or other low-resolution version of a content object that is selectable by a user to access or download a full or higher-resolution version of the content object. Additionally, a user may select the content object to access additional information regarding the content object, such as additional metadata, the source, the author, and so on.

Figure 5:
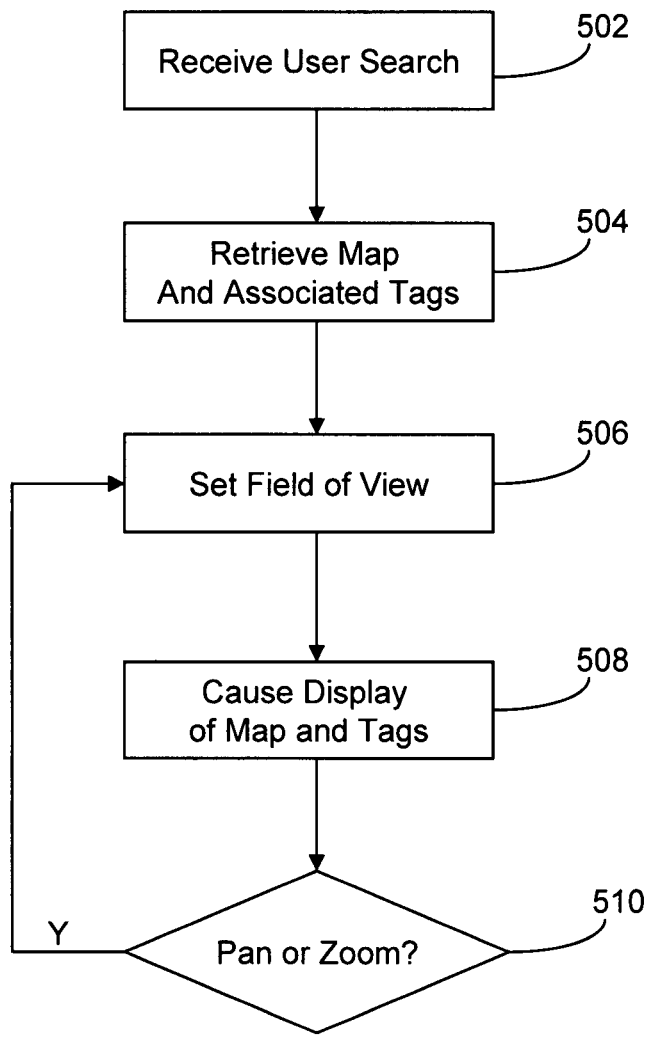
FIG. 5 illustrates a more detailed flow chart for causing the display of a map and associated tags.

FIG. 5 illustrates an exemplary method for causing the display of a map and associated tags. In one example, the method includes receiving a search query at block 502 from a user in the form of a location, zip code, or point of interest. The method includes retrieving a suitable map and tags associated with that location at block 504 and sets a field of view at block 506 (which may be default or user selected). The method further includes causing a display of the map and tags at block 508 by communicating (or causing the communication of) the map and associated tag data to the user device. If the user causes a pan or zoom to occur, e.g., via selecting pan or zoom, the method includes resetting the field of view accordingly at block 510, e.g., by limiting or expanding the area of the map and associated tags to be displayed therewith.

Figure 6:
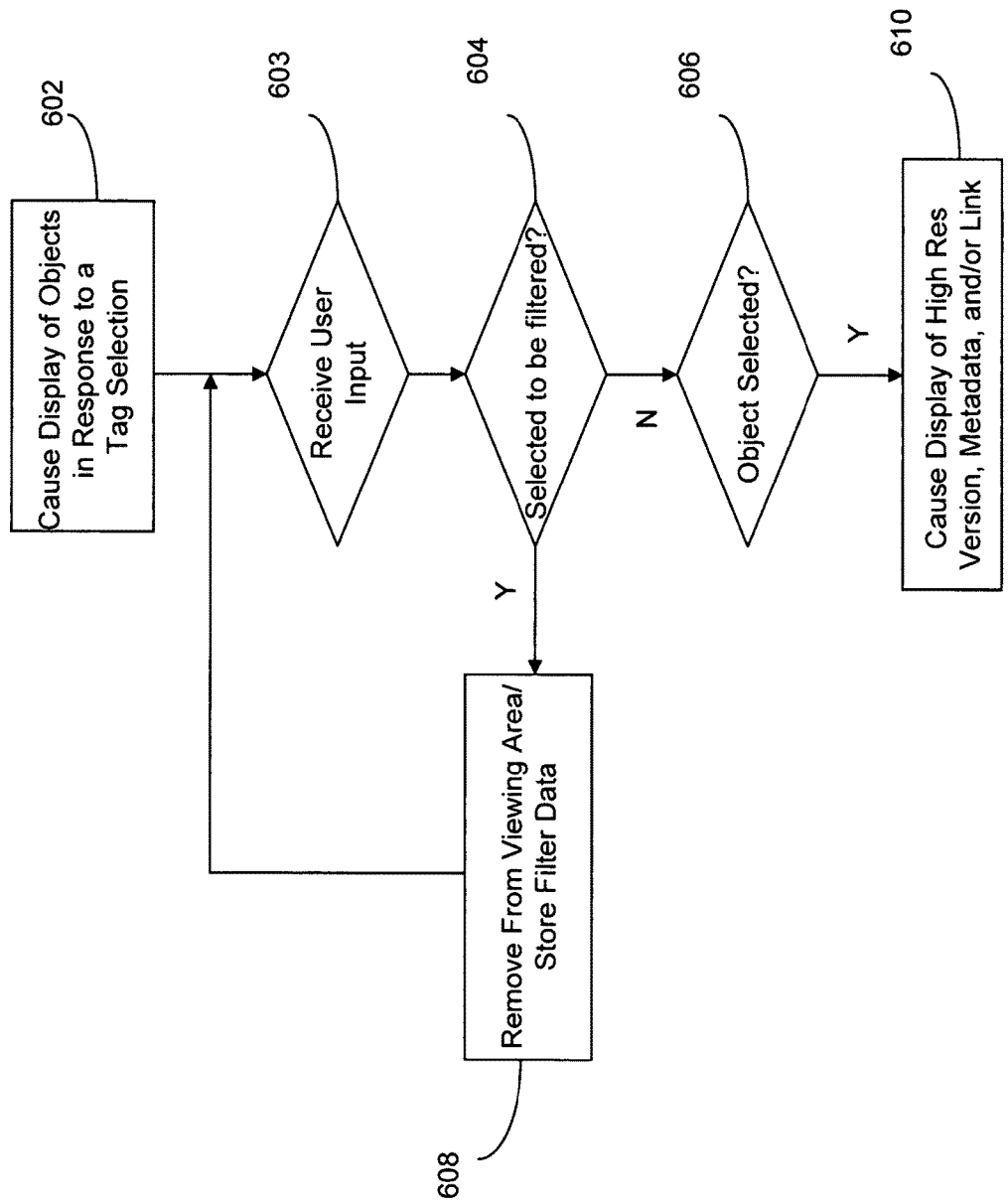
FIG. 6 illustrates a flow chart for tag selection and display of content objects.

FIG. 6 illustrates an exemplary method for causing the display of a set of content objects in response to a selection of a tag. In one example, the method includes causing the display of a set of content objects (i.e., one or more) in response to a selection of a tag at block 602. In one example, block 602 may include retrieving the content objects from a local or remote database and communicating them to a user device. Further, block 602 may include filtering (e.g., via filtering logic) the retrieved content objects to remove content objects based on content types or previous user activity. In one example, the method includes causing the display of any or all of a higher resolution version, link to the source of the content object, or metadata associated therewith at block 610 in response to receiving a user selection of the content object at blocks 603, 606.

The method further includes causing a content object to be removed from display in response to a user selection, e.g., that an object is irrelevant or inappropriate given the tag or map at blocks 603, 604. The user selection may be stored, e.g., by filter logic, and used in subsequent queries at block 608 to remove the content object from display in selections of the tag (either by the particular user or for all users). For example, filter logic may include a threshold value for the number of irrelevant or negative responses a content object receives, at which point the content object is no longer displayed for other users.

Filter logic, e.g., as described with respect to FIG. 1, may remove the connection between a selected tag and resulting content object. Each time a user marks a content object as irrelevant, the filter logic will store that information and use it in subsequent queries to determine whether or not that object should be displayed in relation to the tag. The greater the number of negative marks, the less likely the object is to appear again when that tag has been selected. The media server 100 will be able to dynamically update the filter logic. For example, users that later select the tag may not see content that has previously been marked as irrelevant. It should be understood that the filter logic may apply to only the user filtering the data, or globally to all viewers of the data.

In one example, media server 100 may receive a scored and ranked set of content objects from an external source that is filtered by filter logic 110. When a user gives a content object a negative mark, the media server removes the object from the content viewing area and stores the negative mark in its filter logic 110. In subsequent queries, media server 100 will receive a scored and ranked set of content objects and prevent those which have received a sufficient number of negative marks from being displayed.

The various aspects and examples of the inventions can be implemented in any suitable form including hardware, software, firmware or any combination of these. Different aspects of the invention may be implemented at least partly as computer software or firmware running on one or more data processors and/or digital signal processors. The elements and components of an example of the invention may be physically, functionally, and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some examples, it is not intended to be limited to the specific form set forth herein. Rather, the scope of the present invention is limited only by the claims. Additionally, although a feature may appear to be described in connection with a particular example, one skilled in the art would recognize that various features of the described examples may be combined in accordance with the invention. Moreover, aspects of the invention describe in connection with an example may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising:
a processor; and a non-transitory computer-readable storage medium for tangibly storing thereon program logic for execution by the processor, the program logic comprising:

logic executed by the processor for receiving a search request from a user, said search request comprising information associated with a geographic location;

logic executed by the processor for searching a database for map information associated with said geographic location identified in said search request, said search further comprising identifying information associated with a set of digital content objects that is associated with said geographic location;

logic executed by the processor for causing a display of a viewing window that displays a map and a selectable tag displayed in association with said geographic location within said map display, said displayed map comprising said map information, said selectable tag associated with said set of digital content objects;

logic executed by the processor for receiving a selection of said selectable tag; and logic executed by the processor for automatically causing a separate content viewing window from that of the viewing window displaying the map information and selectable tag to be opened as a new window and adjacently displayed along with, and without overlaying, the display of the viewing window, said content viewing window displaying said set of digital content objects in response to said selection of the displayed selectable tag, said content viewing window further displaying, for each digital content object in said set of digital content objects, information related to a high resolution version of a respective digital content object, a link to the respective digital content object on a network and metadata associated with the respective digital content object.

2. The apparatus of claim 1, further comprising logic for causing a change in the display of at least one tag in response to a change in the map zoom level.

3. The apparatus of claim 1, further comprising logic for filtering a set of content objects based on user input associated with the content objects.

4. The apparatus of claim 1, further comprising logic for filtering a set of content objects based on associated metadata.

5. The apparatus of claim 1, further comprising logic for causing the display of associated tags in response to a selection of the tag.

6. The apparatus of claim 1, further comprising logic for causing the display of additional information in response to a selection of one of the displayed content objects.

7. The apparatus of claim 1, further comprising logic for causing the display of an advertisement.

8. A method comprising:

receiving, at a computing device, a search request from a user, said search request comprising information associated with a geographic location;

searching, via the computing device, a database for map information associated with said geographic location identified in said search request, said search further comprising identifying information associated with a set of digital content objects that is associated with said geographic location;

causing, via the computing device, a display of a viewing window that displays a map and a selectable tag displayed in association with said geographic location within said map display, said displayed map comprising said map information, said selectable tag associated with said set of digital content objects;

receiving, at the computing device, a selection of said selectable tag; and automatically causing, via the computing device, a separate content viewing window from that of the viewing window displaying the map information and selectable tag to be opened as a new window and adjacently displayed along with, and without overlaying, the display of the viewing window, said content viewing window displaying said set of digital content objects in response to said selection of the displayed selectable tag, said content viewing window further displaying, for each digital content object in said set of digital content objects, information related to a high resolution version of a respective digital content object, a link to the respective digital content object on a network and metadata associated with the respective digital content object.

9. The method of claim 8, further comprising changing the display of a tag in response to a change in zoom level.

10. The method of claim 8, further comprising filtering a set of content objects associated with a tag based on user input associated with the content objects.

11. The method of claim 8, further comprising causing the display of associated tags in response to a selection of the tag.

12. The method of claim 8, further comprising causing the display of additional information in response to a selection of one of the displayed content objects.

13. The method of claim 8, further comprising causing the display of an advertisement.

14. A non-transitory computer-readable storage medium tangibly encoded with a computer program product comprising computer executable program code, that when executed by at least one processor, performs a method comprising:

receiving a search request from a user, said search request comprising information associated with a geographic location;

searching a database for map information associated with said geographic location identified in said search request, said search further comprising identifying information associated with a set of digital content objects that is associated with said geographic location;

causing a display of a viewing window that displays a map and a selectable tag displayed in association with said geographic location within said map display, said displayed map comprising said map information, said selectable tag associated with said set of digital content objects;

receiving a selection of said selectable tag; and automatically causing a separate content viewing window from that of the viewing window displaying the map information and selectable tag to be opened as a new window and adjacently displayed along with, and without overlaying, the display of the viewing window, said content viewing window displaying said set of digital content objects in response to said selection of the displayed selectable tag, said content viewing window further displaying, for each digital content object in said set of digital content objects, information related to a high resolution version of a respective digital content object, a link to the respective digital content object on a network and metadata associated with the respective digital content object.

* * * * *